UNITED STATES PATENT OFFICE.

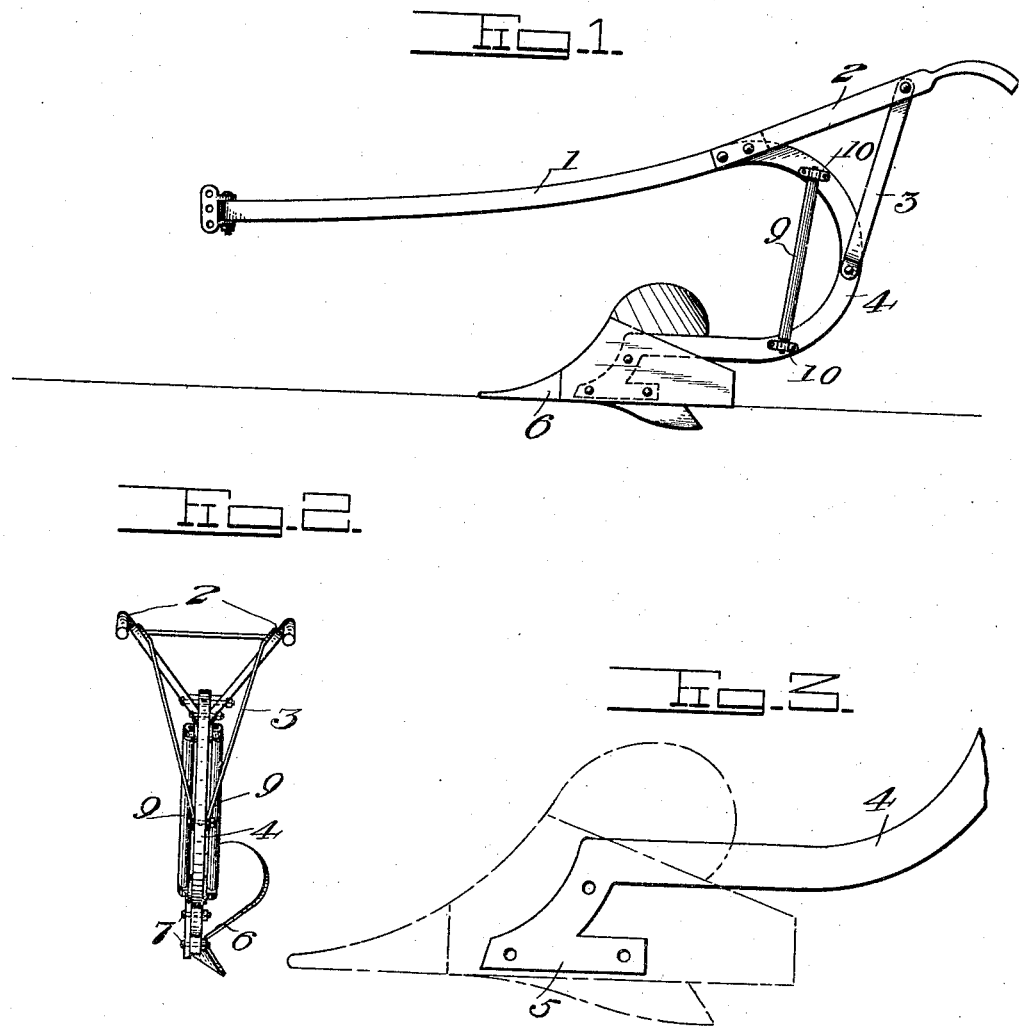

JAMES ROBERT TINNEY, OF PHOENIX, ARIZONA.

PLOW.

1,330,360.

Specification of Letters Patent.  Patented Feb. 10, 1920.

Application filed May 6, 1919. Serial No. 295,134.

*To all whom it may concern:*

Be it known that I, JAMES ROBERT TINNEY, a citizen of the United States, and a resident of Phoenix, in the county of Maricopa and State of Arizona, have invented certain new and useful Improvements in Plows, of which the following is a specification.

My invention is an improvement in plows, and has for its object to provide a plow which will be self-cleaning and nonchokable, wherein the connection between the plow and the beam is so placed that the soil, rubbish and the like will pass over the plow share without being held.

In the drawings:

Figure 1 is a side view of the improved plow, looking from the landside,

Fig. 2 is a rear view,

Fig. 3 is a side view of the connection with the position of the plow indicated by dotted lines.

In the present embodiment of the invention the beam 1 has a C-shaped portion at its rear end one of the arms of the C being a continuation of the beam, while the other is connected to the plow. Handles 2 are connected with the beam, and braces 3 are arranged between the handle and the body of the C-shaped portion 4 of the beam.

It will be noticed that the lower branch of the C-shaped portion is approximately horizontal, and this portion has a substantially L-shaped extension 5 which is secured to the landside of the plow 6. The said L-shaped portion and the landside are secured together by bolts and nuts 7, and preferably a pair of rollers 9 is journaled across the C-shaped extension, the roller being journaled in bearing brackets 10 at their ends, and axes of the rollers incline slightly rearwardly toward their upper ends.

Referring to Fig. 1 with this arrangement of connection between the beam and the plow, weeds, trash, rubbish of all kinds and the soil will pass over the connection, instead of hanging up on the connection as with the usual construction of plow. Thus the plow will be self-cleaning and nonchokable, a feature of importance in implements of this character.

I claim:

In combination with a plow, of a beam and a connection between the plow and the beam, said connection extending from between the moldboard and the landside on a line substantially horizontal well in rear of the share, and thence upward to the beam.

JAMES ROBERT TINNEY.